United States Patent Office 2,762,794
Patented Sept. 11, 1956

2,762,794
METALLISABLE POLYAZO DYESTUFFS

Rudolf Dürig, Basel, Switzerland, assignor to J. R. Geigy A. G., Basel, Switzerland, a Swiss firm No Drawing. Application June 8, 1954,
Serial No. 435,373

Claims priority, application Switzerland June 10, 1953

7 Claims. (Cl. 260—172)

The present invention is concerned with the production of metallisable polyazo dyestuffs which have an affinity to cellulose fibres. It is also concerned with the production of dyestuffs containing heavy metal in complex linkage by treating the new polyazo dyestuffs or the intermediate products used to produce the new dyestuffs with agents giving off metal, in particular with agents giving off copper. Finally it is also concerned with the attainment of very fast, metal containing dyeings on cellulose material with the aid of the new polyazo dyestuffs.

A process is already known for the production of dis- and poly-azo dyestuffs which consists in coupling aceto-acetylamino-hydroxynaphthalene compounds which can be twice coupled with two mols of the same diazonium compound of the benzene and naphthalene series, and also of monoazo dyestuffs. If suitable components are chosen, metallizable disazo and polyazo dyestuffs are obtained which are symmetrical with regard to the azo component. These dyestuffs are suitable for the fast dyeing of mixtures made up from animal and vegetable fibres. A modification of this process consists in first acylating the hydroxyl group in the acetoacetylamino-hydroxynaphthalene compound and then coupling 1 mol of a diazo component at the acetoacetyl radical whereupon the acyloxy group in the monoazo dyestuff formed is saponified to the hydroxyl group and the compound so obtained is then reacted with 1 mol of a diazonium compound different from the first. This modification leads to dyestuffs which, with regard to the azo component, are unsymmetrical.

It has now been found that new, unsymmetrical— with regard to the acetoacetylamino-hydroxynaphthalene compound—very valuable metallizable or metal containing dyestuffs can be produced directly if a tetrazotized 4.4′-diaminodiphenyl compound having a substituent capable of forming a metal complex in both o-positions to the diazo groups, is coupled in an alkaline medium with an equimolecular amount of both a hydroxynaphthalene sulphonic acid and an azo dyestuff, and, if desired, the polyazo dyestuff obtained or an intermediate compound used to form the same is converted into the complex heavy metal compound. The azo dyestuff used for the formation of the polyazo dyestuff is obtained from an acetoacetylamino-hydroxynaphthalene compound with this acylamino group bound either directly or by way of a bridging member to the naphthalene radical, by coupling it in a weakly acid, neutral to weakly alkaline medium with an o-carboxy- or, preferably, an o-hydroxydiazo compound of the benzene or naphthalene series.

The new polyazo dyestuffs which are unsymmetrical with regard to the azo component of the naphthalene series which is capable of coupling twice, correspond to the general Formula I

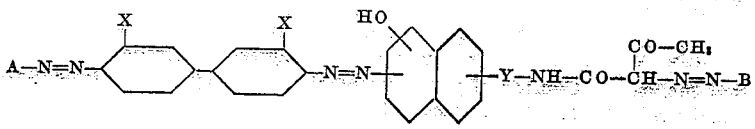

(I)

wherein:

A represents the radical of a hydroxynaphthalene mono- or poly-sulphonic acid,

X represents a substituent capable of forming a metal complex,

Y represents the direct linkage or a bridging member of the formula: —NH—CO—Ph, —NH—CO—NH—Ph— or

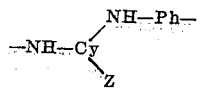

wherein Ph represents a phenylene radical, Cy represents a 1.3.5-triazinyl radical and Z represents a halogen atom, a hydroxyl group or an amine radical, and B represents the radical of a diazo compound of the benzene or naphthalene series which can be further substituted if desired and which contains a carboxyl or, preferably a hydroxyl group in the o-position to the azo group.

If desired the aromatic rings can contain the further substituents usual in azo dyestuffs, e. g. halogen, alkyl, hydroxyl, alkoxy, nitro, acylamino, arylamino, carboxyl, sulphonic acid, sulphonic acid amide, aryl or alkyl-sulphonyl, alkoyl and aroyl groups. Also the naphthalene radical in the above formula can contain preferably sulphonic acid groups whilst the radical B in particular, and also if desired, the phenyl radicals of the bridging member Y or the radical A can have further substituents.

The fundamental observation of the process according to the present invention is that, insofar as diazo components of slight coupling energy are used, in particular the o-hydroxyamino- and if desired, also o-carboxyamino compounds of the benzene and naphthalene series which form diazoxides, it is not necessary to proceed by way of the corresponding acyloxy dyestuffs to produce the monoazo dyestuffs of the general Formula II

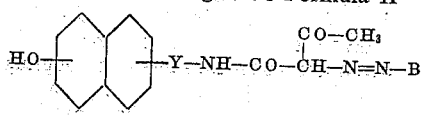

(II)

wherein the symbols have the same meaning as given in Formula I, which are necessary to form the new polyazo dyestuffs. With favorably chosen conditions the monoazo dyestuff coupling at the acetoacetyl radical is well defined.

This process not only enables asymmetrical polyazo dyestuffs of the general Formula I to be produced in a very simple manner but rather it is only because of this process that these dyestuffs are accessible at all and/or can be produced uniformly, as in many cases of monoazo dyestuffs produced by way of the o-acyl derivatives, it is not possible to saponify the acyl radical without the monoazo dyestuff being partly, often very greatly split again, apparently with primary splitting off of the acetoacetyl radical.

Suitable coupling components for the production of the monoazo dyestuffs of the Formula II usable according to the present invention are obtained from such aminohydroxynaphthalene compounds, in particular from aminohydroxynaphthalene sulphonic acids which couple in the o-position to the hydroxyl group of the naphthalene ring after acylation of the amino group. For example, derivatives of 1-amino-7-hydroxynaphthalene and its 3- or 4-sulphonic acids, 1-amino-8-hydroxynaphthalene-3.6- or 4.6-disulphonic acids, 2-amino-6-hydroxynaphthalene-8-sulphonic acid and in particular, 1- or 2-amino-5-hydroxynaphthalene-7-sulphonic acids and 2-amino-8-hydroxynaphthalene-6-sulphonic acid as well as the 3'- or 4'-aminobenzoyl- and 3'- or 4'-aminophenyl carbamyl derivatives thereof. If these compounds, which contain a primary amino group, are reacted preferably in the aqueous solution of their alkali salts, with diketene until the primary amino group disappears, then corresponding acetoacetylamino compounds are obtained which can be used as coupling components. In addition, the products of the reaction in steps of the listed aminohydroxynaphthalene sulphonic acids with cyanuric chloride, an acetoacetylamino-amino compound of the benzene series and, if desired, a further amine, can be used.

Diazo components which can be used for the production of monoazo dyestuffs of the general Formula II are for example: 2-aminobenzene-1-carboxylic acid, 4-chloro- or 5-nitro-2-aminobenzene-1-carboxylic acid, 2-aminobenzene-1-carboxylic acid-5-sulphonic acid or -5-sulphonic acid amide, 2-aminonaphthalene-3-carboxylic acid. The o-hydroxyamino compounds of the benzene series are particularly suitable diazo components. As examples can be named: 2-amino-1-hydroxybenzene, 4-methyl-, 4-chloro-, 5- or 4-nitro-, 4-methylsulphonyl-, 4-acetyl-, 4-acetylamino-, 4.6-dichloro-, 4.6-dinitro, 4-methyl- or -chloro-6-nitro, 6-methyl- or -chloro-4-nitro-, 4-tert. amyl-6-nitro-, 4-acetylamino-6-nitro-, 6-acetylamino-4-nitro-, 4-methyl- or -chloro-5-nitro-2-amino-1-hydroxybenzene, 4-methyl-, 4-chloro-4-nitro- or 4-benzoylamino-2-amino-1-hydroxybenzene-6-sulphonic acid, 6-methyl-, 6-chloro-, 6-nitro-, 6-benzoylamino-2-amino-1-hydroxybenzene - 4 - sulphonic acid, 3-amino-2-hydroxybenzene-1-carboxylic acid-5-sulphonic acid, 4-hydroxy-3-aminobenzene-1-carboxylic acid, 4-hydroxy-3-aminobenzene-1-sulphonic acid or -sulphonic acid amide, -sulphonic acid methylamide, -sulphonic acid dimethylamide, -sulphonic acid diethylamide, -sulphonic acid oxethylamide. Also 1-amino-2-hydroxynapthalene-4- or -6-sulphonic acid and 6-nitronaphthalene-1.2-diazoxide-4-sulphonic acid can be used.

A too strongly alkaline medium should be avoided in the production of monoazo dyestuffs of the Formula II because this favors the naphthol coupling. It is of advantage to determine the most favorable coupling conditions which are dependent on the coupling energy of the diazo component from case to case by a series of trials. Sometimes it is advisable before using the monoazo dyestuff, to free it by redissolving from any naphthol coupling product present.

The following 4.4'-diaminodiphenyl compounds having substituents capable of forming a metal complex can be used to build up the polyazo dyestuffs according to the present invention: 4.4'-diaminodiphenyl-3.3'-dicarboxylic acid, 4.4'-diamino-3.3'-dimethoxydiphenyl, 4.4'-diamino-3.3'-di-(carboxymethyloxy)-diphenyl and if desired also 4.4'-diamino-3.3'-dihydroxydiphenyl. Because of the greater coupling energy required, the first named compounds are to be preferred to the last named. The tetrazotization of these 4.4'-diaminodiphenyl compounds is performed in the usual manner in mineral acid solution or suspension with sodium nitrite in the cold.

It is of advantage to couple the tetrazo compound of the diphenyl series in the first step with the equimolecular amount of a naphthol sulphonic acid. In general, polysulphonic acids are advantageous, in particular 1-hydroxynaphthalene-disulphonic acids such as 1-hydroxynaphthalene-3.6-, -4.8- and in particular the 3.8-disulphonic acid. If desired however, also 1-hydroxynaphthalene-3.6.8-trisulphonic acid, 2-hydroxynaphthalene-3.6- or -6.8-disulphonic acid or 1.8-dihydroxynaphthalene-3.6-disulphonic acid can be used. If the monoazo dyestuff of Formula II is suitably substituted, also naphthol monosulphonic acids can be used, e. g. 1-hydroxynapthalene-4- or -5-sulphonic acid or 2-hydroxynaphthalene-4-, -6-, -7- or -8-sulphonic acid. Also aminonaphthol-sulphonic acids can be used such as for example, 2-amino-5-hydroxynaphthalene-7-sulphonic acid, 2-amino-8-hydroxynaphthalene-6-sulphonic acid or 1-amino-8-hydroxynaphthalene-3.6- or -4.6-disulphonic acid. Compounds which are substituted in the amino group by an acyl or aryl group are also favorable such as, e. g. 2-acetylamino-5-hydroxynaphthalene-7-sulphonic acid, 2 - acetylamino-8-hydroxynaphthalene-6-sulphonic acid or 2-(3'-sulphophenyl)-amino-5-hydroxynaphthalene-7-sulphonic acid or 2-(3'-sulphophenyl)-amino-8-hydroxynaphthalene - 6 - sulphonic acid. The coupling is performed advantageously in the cold with the aqueous solution of the alkali metal salts in the presence of sodium carbonate. It is generally completed very quickly.

The coupling of the diazomonoazo dyestuff in the second step with an equimolecular amount of a monoazo dyestuff of the Formula II which, advantageously, should contain at least one acid water solubilizing group, e. g. carboxyl and preferably sulphonic acid groups, is also performed in the cold inaqueous alkaline solution or suspension. If necessary the coupling can be accelerated by the addition of tertiary nitrogen bases such as pyridine bases, trialkyl or tertiary alkanolamine bases.

The new polyazo dyestuffs of the general Formula I are obtained in the form of their water soluble alkali metal salts as dark powders which dissolve in water with a greyviolet, grey-blue to grey-green colour according to the composition. As such or in the form of their complex heavy metal compounds, if desired after metallizing on the fibre, they dye cellulose material in fast grey-violet, grey-blue to grey-green shades.

To produce the complex heavy metal compounds in substance, it is advantageous to treat the dyestuffs with agents giving off copper in a weakly acid, neutral or alkaline medium, e. g. with copper salts such as copper sulphate, advantageously in the presence of sodium acetate, with copper acetate or with cupritetrammine salts such as cupritetrammine sulphate, or with copper salts in the presence of stronger organic nitrogen bases such as trialkylamine or alkanol amine bases. If desired the complex heavy metal compounds can also be produced by the use of salts of different heavy metals, e. g. cobalt and copper salts. The reaction can be performed at once or in steps. Also the polyazo dyestuffs according to this invention can be only partly metallized previously, then dyed and then metallized afterwards on the fibre. For the production of partly metallized dyestuffs and those metallized with different metals, it is advantageous to use the monoazo dyestuff of the general Formula II in the production of the polyazo dyestuffs according to the present invention in the form of its previously metallized complex heavy metal compound, e. g. in the form of the cobalt or copper compound and then metallize the end product of the coupling in substance or on the fibre with an agent giving off the same or a different heavy metal. The aftertreatment of the cellulose dyeings is done advantageously with copper salts. The coppering of the direct cellulose dyeings either free from metal or partly metallized, can be performed in the dyebath or in a fresh bath in a neutral to weakly acid medium with the usual copper salts such as e. g. copper sulphate or copper acetate. If desired also copper compounds which are stable to alkalies can be used such as are obtained from the reaction of copper sulphate with sodium tartrate in a soda alkaline solution. The cellulose dyeings of the copper containing dyestuffs according to the present invention are distinguished by their very favorable behaviour to anti-crease processing.

The following examples illustrate the invention without limiting it in any way. Parts are given as parts by weight and the temperatures are in degrees centigrade. The relationship of parts by weight to parts by volume is as that of kilogrammes to litres.

Example 1

18.9 parts of 3-amino-4-hydroxybenzene-1-sulphonic acid are diazotized in the usual manner. The clear diazo solution is poured gradually into a solution of 32.3 parts of 2-acetoacetylamino-8-hydroxynaphthalene-6-sulphonic acid and 18 parts of sodium carbonate in 700 parts of water. The dyestuff formation is complete after a few hours. The yellow monoazo dyestuff obtained is precipitated by the addition of 20% by volume of sodium chloride, isolated, and washed with 15% salt solution. It dissolves in water and in concentrated sulphuric acid with a yellow color.

2 - acetoacetylamino - 8 - hydroxynaphthalene - 6 - sulphonic acid is obtained by reacting diketene with the aqueous solution of the sodium salt of 2-amino-8-hydroxynaphthalene-6-sulphonic acid. The reaction is performed at room temperature until the primary amino group disappears.

droxybenzene-1-sulphonic acid the following compounds are used and otherwise the same procedure is followed: 18.8 parts of 3-amino-4-hydroxybenzene-1-sulphonic acid amide or 18.7 parts of 3-amino-4-hydroxybenzene-1-methylsulphone or 22.3 parts of 5-chloro-4-hydroxy-3-aminobenzene-1-sulphonic acid.

If in this example the 1-hydroxynaphthalene-3.8-disulphonic acid is replaced by 31.9 parts of 1-hydroxynaphthalene-4.8-disulphonic acid, 31.9 parts of 1-hydroxynaphthalene-3.6-disulphonic acid or 33.5 parts of 1.8-dihydroxynaphthalene-3.6-disulphonic acid, 31.9 parts of 2-hydroxynaphthalene-3.6-disulphonic acid, 23.9 parts of 2-hydroxynaphthalene-4- or -6-sulphonic acid or 39.9 parts of 1-hydroxynaphthalene-3.6.8-trisulphonic acid and otherwise the same procedure is followed, copper containing trisazo dyestuffs are obtained which also dye cellulose material in greenish-grey shades having similar good fastness properties.

Example 2

To form the trisazo dyestuff, the tetrazo solution from 24.4 parts of 4.4'-diamino-3.3'-dimethoxydiphenyl is produced and then poured at 0–5° into a solution of 31.9 parts of 1 - hydroxynaphthalene - 3.8 - disulphonic acid and 35 parts of sodium carbonate in 1000 parts of water. The formation of the diazomonoazo dyestuff is completed after a short time and no tetrazonium compound can be traced. The solution of the yellow monoazo dyestuff described in the first paragraph in 1000 parts of water is then poured at 30° into the above diazomonoazo dyestuff in the presence of sodium carbonate while allowing the temperature to rise slowly to 20°. After a few hours, the coupling is complete. The trisazo dyestuff formed of the formula:

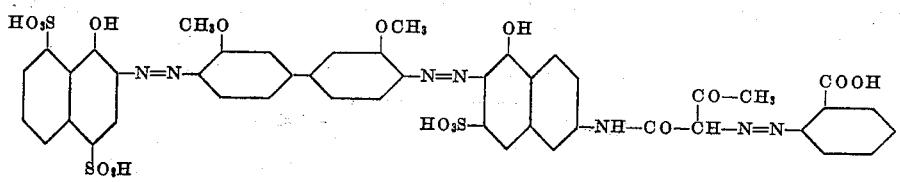

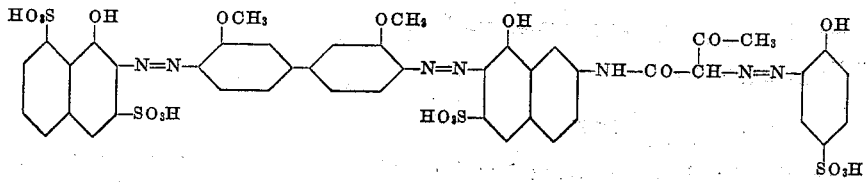

is precipitated by the addition of sodium chloride, isolated and the damp filter cake is dissolved in 1000 parts of water at 90°. The mixture of 300 parts of a monomolar copper sulphate solution and 150 parts of a 20% ammonium hydroxide solution is then added and the whole is stirred for 12 hours at 90–95°. The dyestuff is isolated by the addition of 25% by volume of sodium chloride, the precipitate is filtered off, washed with 15% salt solution and dried.

The copper-containing trisazo dyestuff so obtained dissolves in warm water and in concentrated sulphuric acid with a green-grey color. It dyes cotton and other cellulose material directly in greenish-grey shades and the dyeings have good fastness to washing and water and very good fastness to light. The viscose dyeings are chiefly distinguished by an excellent fastness to anti-crease processing.

Trisazo dyestuffs which also dye cotton and regenerated cellulose in greenish-grey shades with similar fastness properties are obtained if instead of 3-amino-4-hy- The diazo compound of 13.7 parts of 2-aminobenzene-1-carboxylic acid is coupled in an aqueous solution in the presence of 26 parts of sodium carbonate with 32.3 parts of 2-acetoacetylamino-5-hydroxynaphthalene-7-sulphonic acid. The yellow monoazo dyestuff formed is coupled under the same conditions as described in Example 1 with the coupling product of the tetrazo compound of 24.4 parts or 4.4'-diamino-3.3'-dimethoxydiphenyl with 31.9 parts of 1-hydroxynaphthalene-4.8-disulphonic acid. The coupling is performed in the presence of sodium carbonate and the trisazo dyestuff is obtained. The copper complex compound obtained therefrom according to the method described in Example 1 dyes cotton and staple fibre directly in vivid greenish-grey shades which have good wet fastness and very good light fastness properties. The cellulose dyeings are distinguished by their very favourable behaviour in anti-crease processing. The copper containing dyestuff obtained by the use of the same number of parts of 1-hydroxynaphthalene-3.8-disulphonic acid has similar properties.

If instead of 13.7 parts of 2-aminobenzene-1-carboxylic acid, 21.6 parts of 2-aminobenzene-1-carboxylic acid -5-sulphonic acid amide or 30.3 parts of 5-amino-4-hydroxy-3-benzoylamino-1-sulphonic acid are used and otherwise the same procedure is followed, dyestuffs are obtained which dye cellulose material in blue to greenish-grey shades. The dyeings have good fastness properties and also excellent stability to anti-crease processing.

If in this example the 2-acetoacetylamino-5-hydroxynaphthalene-7-sulphonic acid is replaced by 32.2 parts of 1 - acetoacetylamino - 5 - hydroxynaphthalene - 7 - sulphonic acid and the same procedure is followed, copper containing trisazo dyestuffs are obtained which dye cotton in grey shades with similar fastness properties.

Example 3

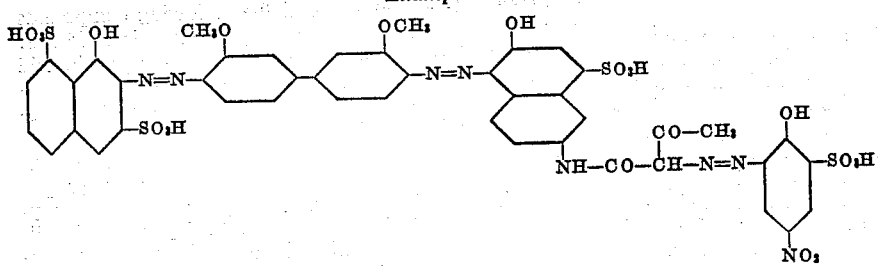

The yellow monazo dyestuff obtained with the diazo compound from 23.4 parts of 5-nitro-3-amino-2-hydroxy-benzene-1-sulphonic acid and 32.3 parts of 2-acetoacetyl-amino-6-hydroxynaphthalene-8-sulphonic acid is coupled in an aqueous solution containing sodium carbonate as described in Example 1, to form the trisazo dyestuff with the coupling product of the tetrazo compound of 24.4 parts of 4.4'-diamino-3.3'-dimethoxy-diphenyl and 31.9 parts of 1-hydroxynaphthalene-3.8-disulphonic acid. The trisazo dyestuff is then converted into its copper complex compound. The copper containing dyestuff dyes cotton and staple fibre directly in greenish-grey shades which have good washing and water fastness and very good light fastness properties. They are excellently stable to anti-crease processing.

Dyestuffs which dye cellulose material in similar shades with similar properties are obtained if the 5-nitro-3-amino-2-hydroxybenzene-1-sulphonic acid is replaced by 18.8 parts of 3-amino-4-hydroxybenzene-1-sulphonic acid amide or 22.3 parts of 5-chloro-4-hydroxy-3-aminobenzene-1-sulphonic acid and otherwise the same procedure is followed.

Example 4

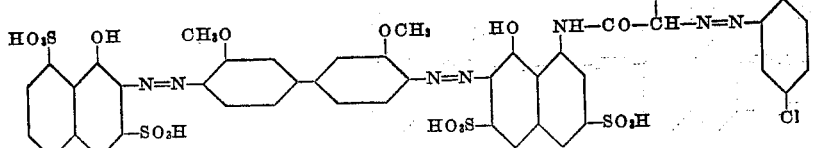

The diazo compound from 14.35 parts of 1-amino-2-hydroxy-5-chlorobenzene is coupled in the presence of 18 parts of sodium carbonate with 40.3 parts of 1-acetoacetylamino-8-hydroxynaphthalene-3.6-disulphonic acid. The yellow monazo dyestuff obtained in this matter is coupled as described in Example 1 with the coupling product of the tetrazo compound from 24.4 parts of 4.4'-diamino-3.3'-dimethoxydiphenyl and 31.9 parts of 1-hydroxynaphthalene-3.8-disulphonic acid to form the trisazo dyestuff. The dyestuff, when treated in substance with agents giving off copper, dyes cotton and regenerated cellulose in reddish-grey shades. The dyeings have good fastness to washing and light and are stable to anti-crease processing.

If in this example, the 1-acetoacetylamino-8-hydroxy-naphthalene-3.6-disulphonic acid is replaced by 67.9 parts of the condensation product produced in the known manner from 31.9 parts of 1-amino-8-hydroxynaphthalene-3.6-disulphonic acid, 18.4 parts of cyanuric chloride, 19.2 parts of 1-amino-4-acetoacetylaminobenzene and 9.3 parts of aminobenzene or 12.4 parts of amino-p-methoxybenzene and otherwise the same procedure is followed then a copper containing trisazo dyestuff is obtained which dyes cellulose fibres in blue-grey shades which have similar good fastness properties.

Example 5

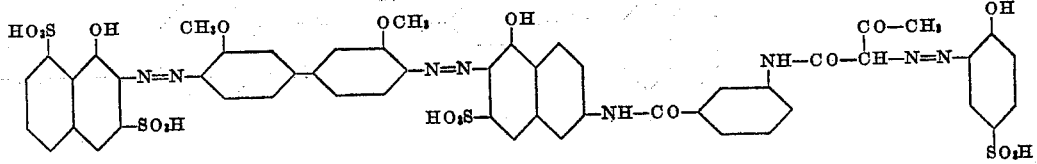

A diazo solution from 18.9 parts of 4-hydroxy-3-aminobenzene-1-sulphonic acid is poured slowly at 0–5° into an aqueous solution of 44.2 parts of 2-(3'-acetoacetylamino) - benzoylamino - 5 - hydroxynaphthalene - 7 - sulphonic acid and 18 parts of sodium carbonate. The yellow monoazo dyestuff so formed is isolated as described in Example 1 and coupled with the coupling product of the tetrazo compound from 24.4 parts of 4.4'-diamino-3.3'-dimethoxy-diphenyl and 31.9 parts of 1-hydroxynaphthalene-3.8-disulphonic acid. The isolated trisazo dyestuff, when coppered in substance, dyes cotton and staple fibre directly in strong blue-grey shades which have good washing and water fastness properties and very good fastness to light. The dyeings are excellently stable to anti-crease processing.

If in this example instead of 2-(3'-acetoacetylamino)-benzoylamino - 5 - hydroxynaphthalene - 7 - sulphonic acid, 44.2 parts of 2-(4'-acetoacetylamino)-benzoylamino-5-hydroxynaphthalene-7-sulphonic acid, 45.7 parts of 2-(4' - acetoacetylaminophenyl) - carbamylamino - 5 - hydroxynaphthalene-7-sulphonic acid or 45.7 parts of 2-(4'-acetoacetylaminophenyl) - carbamylamino - 8 - hydroxy-naphthalene-6-sulphonic acid are used, then copper containing dyestuffs which produce cellulose dyeings with similar fastness properties are obtained.

Example 6

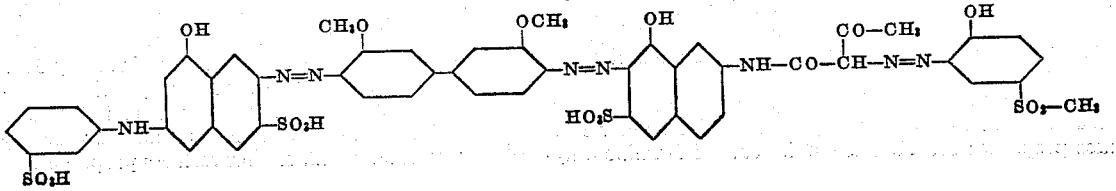

The diazo compound of 18.7 parts of 3-amino-4-hydroxybenzene-1-methyl sulphone is coupled in an aqueous solution in the presence of 25 parts of sodium carbonate with 32.3 parts of 2-acetoacetylamino-8-hydroxynaphthalene-6-sulphonic acid. The yellow monoazo dyestuff so formed is coupled under the same conditions as are given in Example 1 in the presence of sodium carbonate with the coupling product of the tetrazo compound of 24.4 parts of 4.4'-diamino-3.3'-dimethoxydiphenyl and 39.5 parts of 2-(3'-sulphophenyl)-amino-5-hydroxynaphthalene-7-sulphonic acid to form the trisazo dyestuff. The copper complex compound obtained therefrom according to the method described in Example 1 dyes cotton and staple fibres directly in strong grey shades which have good wet fastness and good light fastness properties. The cellulose dyeings are distinguished by their very favorable behaviour to anti-crease processing.

I in this example the 2-(3'-sulphophenyl)-amino-5-hydroxynaphthalene-7-sulphonic acid is replaced by 39.5 parts of 2-(3'-sulphophenyl)-amino-8-hydroxynaphthalene-6-sulphonic acid or 23.9 parts of 2-amino-8-hydroxynaphthalene-6-sulphonic acid or 28.1 parts of 2-acetylamino-8-hydroxynapthalene-6-sulphonic acid or 28.1 parts of 2-acetylamino-5-hydroxynaphthalene-7-sulphonic acid and otherwise the same procedure is followed, dyestuffs are obtained which dye cellulose material in blue to greenish-grey shades which have good fastness properties and also have excellent stability to anti-crease processing.

Example 7

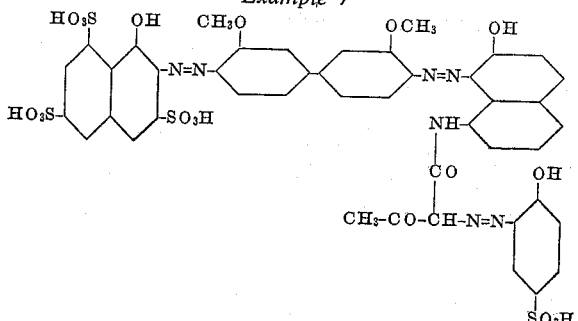

The diazo compound from 18.9 parts of 3-amino-4-hydroxy-benzene-1-sulphonic acid is coupled in a soda alkaline medium with 24.3 parts of 1-acetoacetylamino-7-hydroxynaphthalene. The yellow monoazo dyestuff so obtained is converted in a soda alkaline solution into the trisazo dyestuff in the manner described in Example 1 with the coupling product of the tetrazo-compound from 24.4 parts of 4.4'-diamino-3.3'-dimethoxydiphenyl and 39.9 parts of 1-hydroxynaphthalene-3.6.8-trisulphonic acid. The trisazo dyestuff thus produced when coppered in substance dyes cotton and staple fibre directly in blue-grey shades which have good washing and light fastness properties. The dyeings are very stable to anti-crease processing.

If the 39.9 parts of 1-hydroxynaphthalene-3.6.8-trisulphonic acid are replaced by 31.9 parts of 1-hydroxynaphthalene-3.8-disulphonic acid, then a coppered dyestuff which is somewhat less soluble is obtained. It dyes cellulose fibres in pure blue-grey shades which have similar fastness properties.

Example 8

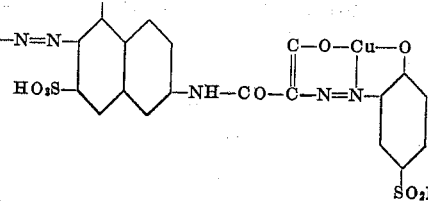

The yellow monoazo dyestuff formed from the diazo compound from 18.8 parts of 3-amino-4-hydroxybenzene-1-sulphonic acid amide and a solution, containing sodium carbonate, of 32.3 parts of 2-acetoacetylamino-5-hydroxynaphthalene-7-sulphonic acid is isolated and converted at 90–95° in an aqueous solution into the corresponding copper complex compound with a mixture of 100 parts of a monomolar copper sulphate solution and 50 parts of a 20% ammonium hydroxide solution. This conversion takes 3 hours. The copper containing dyestuff in an aqueous solution is then coupled in the manner described in Example 1 with the coupling product of the tetrazo compound from 24.4 parts of 4.4'-diamino-3.3'-dimethoxydiphenyl and 31.9 parts of 1-hydroxynaphthalene-3.8-disulphonic acid in a soda alkaline solution to form the trisazo dyestuff. The copper containing trisazo dyestuff so obtained dyes cotton in strong blue-grey shades which, on being after coppered, are fixed fast to washing and water. The dyeings have very good light fastness. The coppered cellulose dyeings are very stable to anti-crease processing.

If instead of treating the yellow monoazo dyestuff described above with copper tetramine hydroxide in aqueous solution, it is converted into the corresponding cobalt complex compound at 80° with 100 parts of a monomolar cobalt acetate solution and the cobalt complex compound is then coupled as described above to form the corresponding trisazo dyestuff and the cobalt containing dyestuff is treated with agents giving off copper, then a dyestuff containing cobalt and copper is obtained which also dyes cellulose fibres in strong blue-grey shades which have good fastness properties.

If in this example the 32.3 parts of 2-acetoacetylamino-5-hydroxynaphthalene-7-sulphonic acid are replaced by 32.3 parts of 2-acetoacetylamino-6-hydroxynaphthalene-8-sulphonic acid, then with the same procedure the corresponding copper containing or cobalt and copper containing trisazo dyestuffs are obtained which dye cellulose material in neutral grey shades. The dyeings have good fastness to washing and light. These dyeings also are very stable to anti-crease processing.

Example 9

2 parts of the dyestuff obtained according to Example 1 are dissolved in a dyebath containing 3000 parts of water and 2 parts of soda. 100 parts of cotton are entered at 40–50°, the bath is heated within 30 minutes to 90–95°, 30 parts of sodium sulphate are added and dyeing is performed for 45 minutes at this temperature. At the end of this time, the dyed goods are rinsed cold in the usual way and dried. The cotton is dyed in greenish-grey shades which have good wet fastness and very good light fastness properties.

What I claim is:

1. A trisazo dyestuff which corresponds to the formula

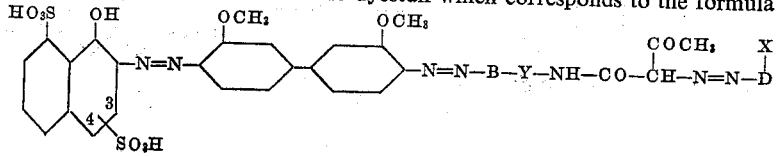

wherein —N=N—B—represents a member selected from the group consisting of

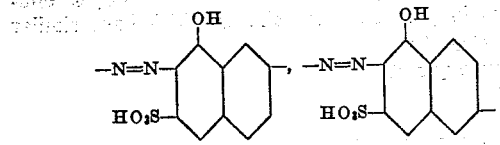

and

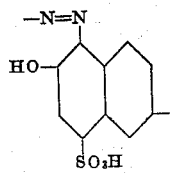

Y represents a member selected from the group consisting of the direct linkage and the —NH—CO—Ph—, —NH—CO—NH—Ph— and

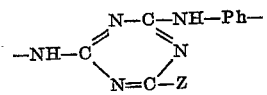

radicals, wherein Ph represents a phenylene radical and Z represents a phenylamino radical, X represents a member selected from the group consisting of OH and COOH in o-position to the azo group, and D represents a radical of the benzene series.

2. A trisazo dyestuff which corresponds to the formula:

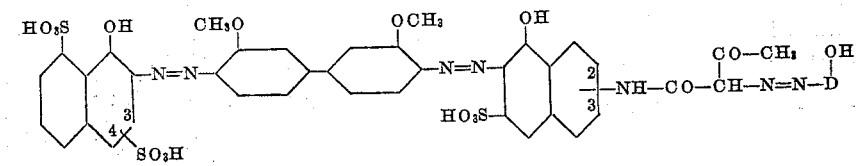

wherein D represents a radical of the benzene series containing the hydroxyl group in ortho-position to the azo group.

3. A trisazo dyestuff having the formula:

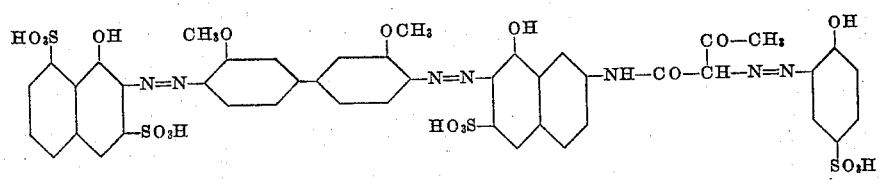

4. A trisazo dyestuff having the formula:

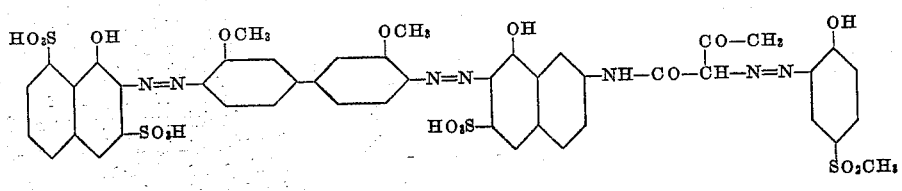

5. A trisazo dyestuff having the formula:

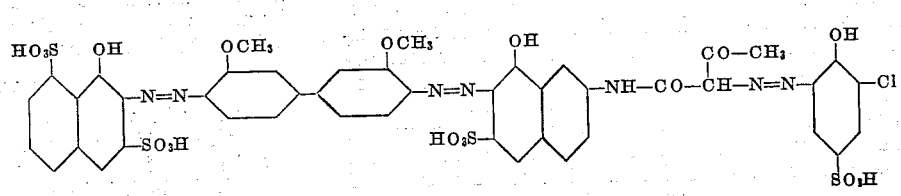

6. A trisazo dyestuff having the formula:

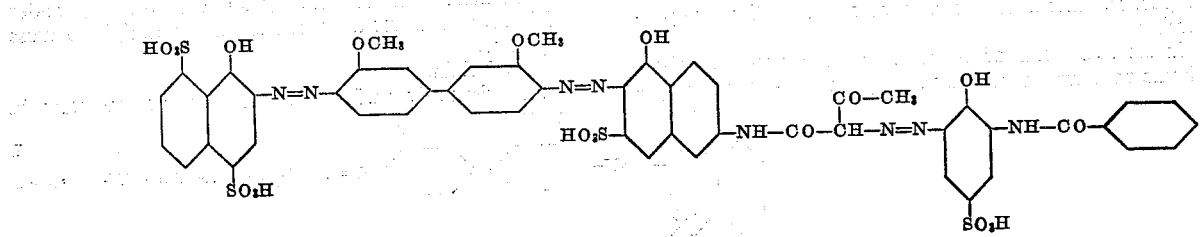

7. A trisazo dyestuff having the formula:
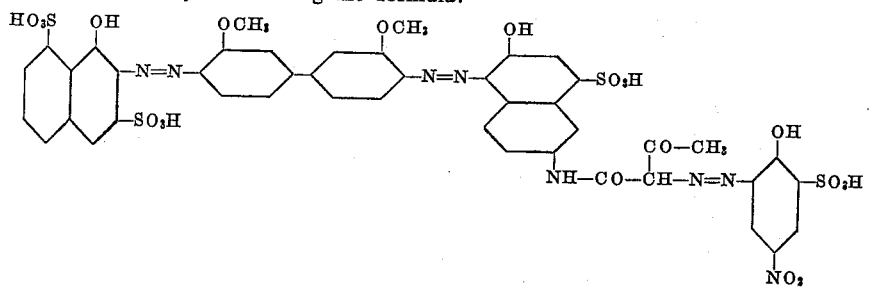
References Cited in the file of this patent
UNITED STATES PATENTS
| | | |
|---|---|---|
| 521,095 | Bernthsen et al. | June 5, 1894 |
| 561,694 | Blank et al. | June 9, 1896 |
| 1,889,732 | Stusser et al. | Nov. 29, 1932 |